United States Patent [19]

Koumura et al.

[11] Patent Number: 4,528,576
[45] Date of Patent: Jul. 9, 1985

[54] RECORDING APPARATUS

[75] Inventors: Noboru Koumura, Narashino; Nobutoshi Mitzusawa, Yokohama; Kunitaka Ozawa, Tokyo, all of Japan

[73] Assignee: Canon Kabushiki Kaisha, Tokyo, Japan

[21] Appl. No.: 483,119

[22] Filed: Apr. 8, 1983

[30] Foreign Application Priority Data

| Apr. 15, 1982 | [JP] | Japan | 57-61818 |
| Apr. 15, 1982 | [JP] | Japan | 57-61819 |
| Apr. 16, 1982 | [JP] | Japan | 57-62585 |
| Apr. 16, 1982 | [JP] | Japan | 57-62586 |

[51] Int. Cl.$^3$ ............................................. G01D 15/18
[52] U.S. Cl. ................................. 346/140 R; 358/75; 346/75
[58] Field of Search ............ 346/204, 140 PD, 140 R, 346/140 IJ, 46 C, 46 PH, 75; 358/75, 316; 400/120, 126, 280

[56] References Cited

U.S. PATENT DOCUMENTS

| 4,320,406 | 3/1982 | Heinzl | 346/140 R |
| 4,395,720 | 7/1983 | Grover et al. | 346/140 PD |
| 4,396,924 | 8/1983 | Rosenstock | 346/140 PD |
| 4,412,225 | 10/1983 | Yoshida et al. | 346/75 |
| 4,418,356 | 9/1983 | Reece | 346/140 PD |

Primary Examiner—E. A. Goldberg
Assistant Examiner—Art Evans
Attorney, Agent, or Firm—Fitzpatrick, Cella, Harper & Scinto

[57] ABSTRACT

A recording apparatus includes a plurality of recorders each of which is provided for a color to be recorded, these recorders being reciprocated relative to a recording medium such that they are selectively driven in a combination upon their forward movement and in another combination upon the reverse movement of the recorders.

8 Claims, 21 Drawing Figures

↑ ONE STEP

FIG. 9

↑ ONE STEP

RECORDING APPARATUS

BACKGROUND OF THE INVENTION

1. Field of the Invention

The present invention relates to a recording apparatus comprising recording means which is reciprocatable recording an image and including a plurality of orders each of which is provided for a color to be orded.

2. Description of the Prior Art

Reciprocative scan system has been considered to be effective measure which permits recording apparates such as ink-jet type printers, thermal transfer type nters and the like to operate at higher speed. It has n further considered that the reciprocative scan tem can eliminate any vibration in a carriage at re-sal and also control the speed of a motor for driving carriage in a more uncomplicated manner since the riage is always reciprocated at the same speed.

Figure 1A:
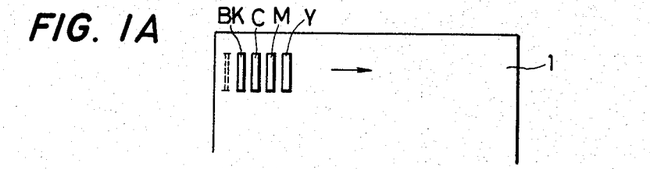
FIGS. 1A and 1B are views showing a recording process in the prior art in the forward and return movements, respectively.
Figure 1B:
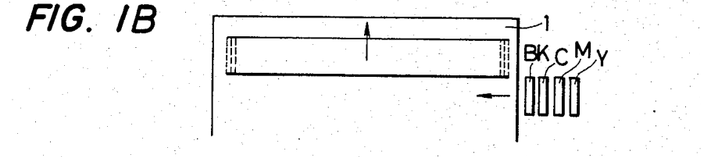

However, the reciprocative scan system will have the lowing disadvantage if it is applied to such a prior art ording apparatus that includes a plurality of record-: heads each provided for a color to be recorded and ated side by side in the primary scan direction, that in such a direction that the carriage is reciprocated. this case, the recording operation would be carried : with colored inks overlapped in the wrong order ring the return movement of the carriage. For exam-:, assuming that a recording operation is effected with ored inks of yellow, magenta, cyan and black (here-fter referred respectively to Y, M, C and BK) in this ler in the forward movement of the carriage as wn in FIG. 1A, the colored inks would be used in reverse order of BK, C, M and Y in the return vement of the carriage as shown in FIG. 1B. Conse-ntly, an area to be originally recorded with the same or will be recorded with different colored inks dur-the reciprocative movement of the carriage. In ier words, if the colored inks are placed one over ther on a recording paper 1 with the order of Y, M l C in the forward movement of the carriage as wn in FIG. 2A, the order would be reversed to be C, and Y in the return movement of the carriage as wn in FIG. 2B. Therefore, the color C is emphasized ing the forward movement of the carriage while the or Y is emphasized in the return movement of the ie. This produces a difference in color tone in the ondary scan direction (paper-feed direction) to pro-e an obscure image.

SUMMARY OF THE INVENTION t is an object of the present invention to overcome above disadvantage in the prior art and to provide recording apparatus which can improve the quality image.

Another object of the present invention is to provide ecording apparatus which can record images with fixed order of colors.

Still another object of the present invention is to vide a recording apparatus which can improve the ility of image by a plurality of recording heads that selected and driven to utilize the same order of ored inks during the reciprocative movement of the ording heads.

A further object of the present invention is to provide ecording apparatus comprising a plurality of record-heads each of which is provided for a color to be recorded and which are disposed in the secondary scan direction, the recording heads being adapted to reciprocate in the primary scan direction to operate for recording during their reciprocative movement.

A further object of the present invention is to provide a recording apparatus comprising a plurality of recording heads each of which is provided for a color to be recorded and which are disposed in two stages to reciprocate and record in the primary scan direction with the same order of colors in both the forward and return movements of the recording heads.

These and other objects will be apparent from reading the following detailed description of the present invention in connection with the accompanying drawings.

DETAILED DESCRIPTION OF PREFERRED EMBODIMENTS

The present invention will now be described with reference to the drawings.

Figure 3:
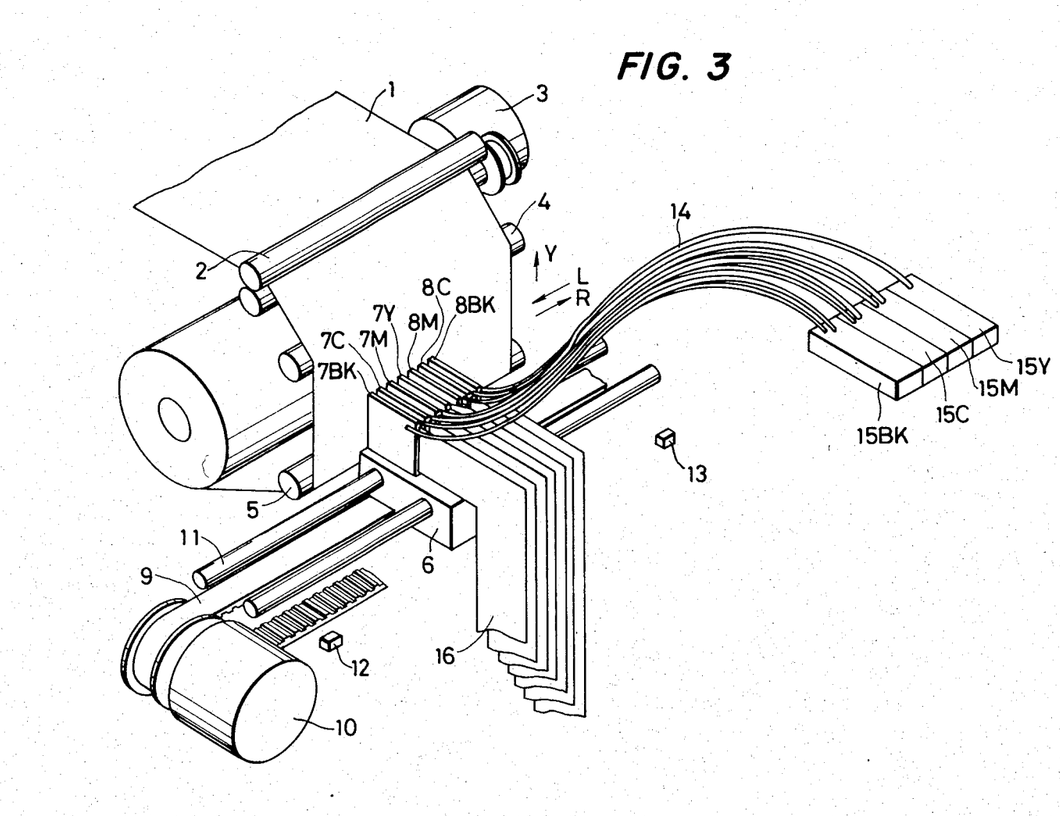
FIG. 3 is a perspectivel view of one embodiment of a printer according to the present invention.

FIG. 3 shows one embodiment of a multi-nozzle ink-jet type color printer constructed according to the present invention, which comprises a paper-feed roller 2 feeding a recording paper 1 in a direction shown by an arrow Y, that is, in the secondary scan direction; a paper-feed pulse motor 3 driving the paper-feed roller 2; and guide rollers 4 and 5 defining a plane of recording.

The printer also includes a carriage on which seven multi-nozzle ink-jet heads 7Y, 7C, 7M, 7BK, 8M, 8C and 8BK are mounted. The carriage 6 is driven by a carriage-feed pulse motor 10 through a timing belt 9 to reciprocate along guide rails 11 in a direction shown by arrows R and L (primary scan direction). In two left and right home positions, the carriage 6 is detected carriage-position sensors 12 and 13 which in turn provide detection signals. Each of the heads 7Y–8BK is supplied with an ink through the respecitve one of ink supplying pipes 14 which are connected with ink tanks 15Y, 15M, 15C and 15BK respectively containing colored ink Y, M, C and BK therein. More particularly, the ink tank 15Y is connected to the head 7Y; the ink tank 15M to the heads 7M and 8M; the ink tank 15C to the heads 7C and 8C; and the ink tank 15BK to the heads 7BK and 8BK. The nozzles in the heads 7Y–8BK are adapted to be energized by drive pulses from flexible printed circuit boards 16.

The multi-nozzle ink-jet heads 7Y, 7M, 7C and 7BK are used to provide the colored inks; yellow, magenta, cyan and black inks, respectively. Similarly, ink-jet heads 8M, 8C and 8BK are used to provide the colored inks; yellow, magenta, cyan and black inks, respectively. Each of these heads includes 128 nozzles which are disposed on a straight line in the direction Y with a pitch of eight nozzles per one millimeter. The nozzles of one of the heads are energized by drive pulses from the corresponding printed circuit board 16 to discharge the colored ink toward the recording paper 1. This discharge may be accomplished, for example, by a bubble-jet type system in which a heating element is embedded in one nozzle and energized by a pressurizing pulse to produce a bubble which is in turn used to discharge a droplet of ink.

Figure 4:
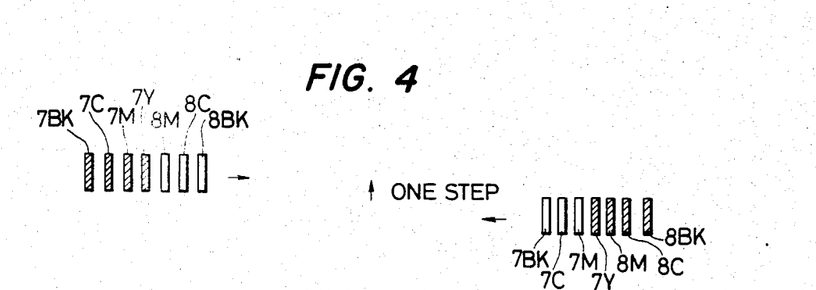
FIG. 4 is a diagram showing the recording process in the printer shown in FIG. 3.

The heads are located along the primary scan direction in the order of 8BK, 8C, 8M, 7Y, 7M, 7C and 7BK from the right side of FIG. 3 to the left side thereof. In other words, the heads 7M, 7C, 7BK used in the forward movement of the carriage 6 are arranged symmetrically about the common yellow head 7Y relative to the corresponding heads 8M, 8C, 8BK used in the return movement of the carriage. When the carriage 6 is moved in the direction shown by the arrow R, the common head 7Y and the other heads 7M, 7C, 7BK which are shown by the left-hand hatching in FIG. 4 are only driven. When the carriage 6 is moved in the direction L, the common head 7Y and the other heads 8M, 8C, 8BK shown by the right-hand hatching in FIG. 4 are only driven. Thus, a color image may be recorded on the recording paper 1.

In this manner, the heads used in the forward movement of the carriage are provided independently of the heads used in the return movement of the carriage. Moreover, two heads for the same color are symmetrically arranged about the single and common head. Furthermore, the change in the scan direction causes the corresponding change in the head to be used. Therefore, the order of colored inks to be used is always maintained during the reciptocation of the carriage so that any disturbance in color tone can effectively be prevented.

Figure 5:
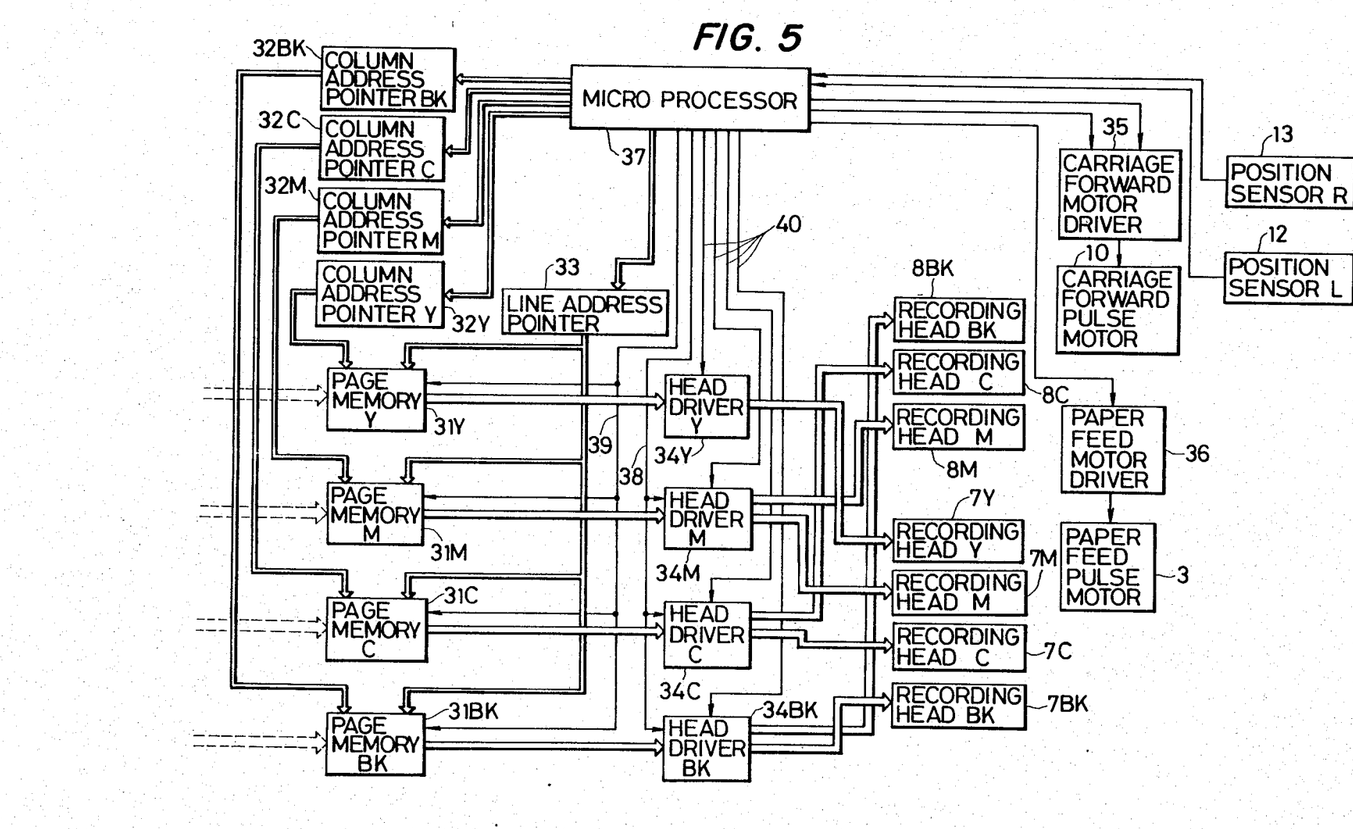
FIG. 5 is a block diagram of a control circuit which may be used in the printer shown in FIG. 3.
Figure 6:
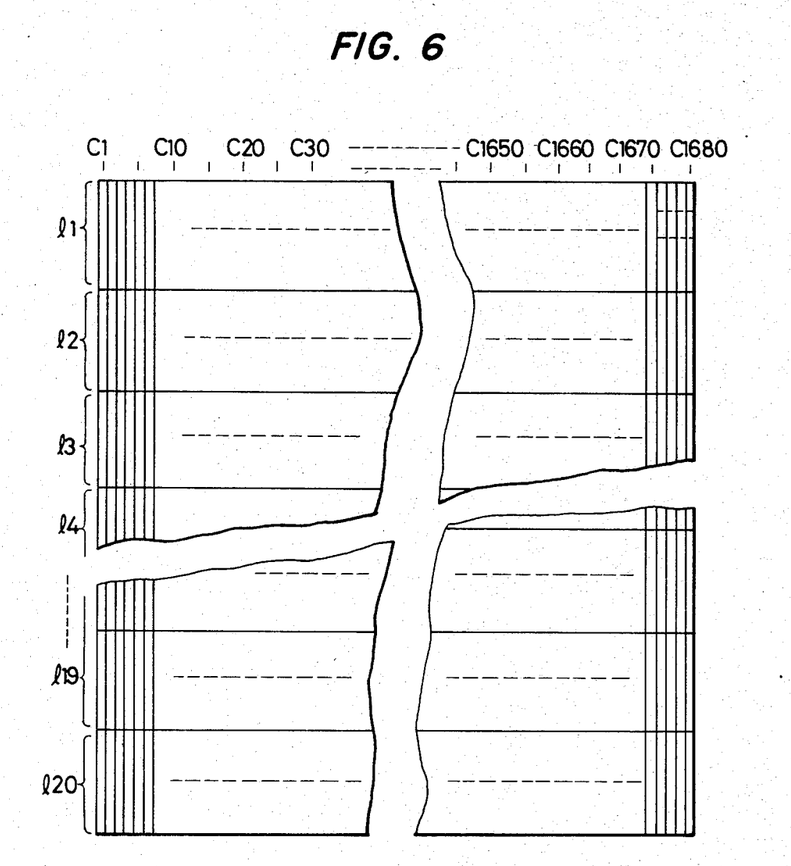
FIG. 6 is a diagram showing an example of the address assignment in the page memory shown in FIG. 5.

FIG. 5 shows a control circuit which may be used in the color printer of FIG. 3 and which includes page memories (image memories) 31K, 31M, 31C and 31BK. FIG. 6 shows an example of the address assignment in one of these page memories. For example, it is assumed herein that a recording paper used is of A4 size and that this recording paper is used along the length thereof with the whole side of the paper being printed under the density of 8 dots/mm. In this case, the address assignment in the page memory is such that one address is assigned to one dot in connection with the horizontal 1680 dots/210 mm to provide addresses C1 to C1680 (column addresses) while one address is assigned to each of 128 dots corresponding to 128 nozzles in one recording head in respect to the vertical 2576 dots/297 mm to provide addresses l1 to l20 (line addresses). In FIG. 6, the line address is designated on the horizontal axis while the column address is denoted on the vertical axis. The total number of dots summed from the first column address to the 20th column address is 2560, so that the remaining 16 dots/2 mm are suitably kept in the top and bottom blanks of the recording paper.

The control circuit shown in FIG. 5 will be described with reference to FIG. 6. The control circuit comprises column-address pointers 32Y, 32M, 32C and 32BK for addressing the column addresses in the respective page memories 31Y, 31C, 31M and 31BK. In the illustrated embodiment, the column-address pointers are ring counters for counting the dots 0001–1680. The control circuit also includes a line-address pointer 33 for addressing the line addresses in the page memories at the same time; head drivers 34Y, 34M, 34C and 34BK each of which drives the 128 ink-jet nozzles in the corresponding recording head 7Y, 7M, 7C, 7BK, 8M, 8C or 8BK in accordance with dot signals read out of the corresponding page memory 31Y, 31C, 31M and 31BK; a motor driver 35 for driving the carriage-feed pulse motor 10; a motor driver 36 for driving the paper-feed pulse motor 3; and a microprocessor (control computer) 37 for controlling the above components. Head changing signals 38 are applied from the microprocessor 37 to the respecitve head drivers 34M, 34C and 34BK to select the heads to be driven.

The recording process in the recording system according to the present invention will be described also with reference to FIG. 4. First of all, the carriage 6 is moved leftward in the direction L and then stopped at a position in which it is detected by the left-hand sensor 12 which in turn produces a detection signal (left-hand home position). At this time, the central recording head 7Y is in the extreme left position within the range of recording as shown in the left side of FIG. 4. This position of the central head corresponds to the column address C0001. The column address pointers 32Y, 32M, 32C and 32BK are then preset at the column addresses 0001, 1600, 1520 and 1440, respectively. The line-address pointer 33 is also preset at the line address 01. The head drivers 34M, 34C and 34BK except the head driver 34Y are inoperative under the action of disable signals 40 supplied thereto. In response to the signal from the position sensor 12, head changing signals 38 are applied from the microprocessor 37 to the head drivers 34M, 34C and 34BK so that the lines to the recording heads 8M, 8C and 8BK used in the return movement of the carriage will be cut off.

In such a state, if reading signals 39 are supplied to the page memories 31Y, 31M, 31C and 31BK, dot data are read out from the respective addresses l01C0001, l01C1600, l01C1520 and l01C1440 in the page memories 31Y, 31M, 31C and 31BK. However, only the yellow dot is recorded on the recording paper 1 in response to yello dot data from the recording head 7Y since only the head driver 34Y is energized. Subsequently, the contents of the column-address pointers 32Y, 32M, 32C and 32BK are stepped in the forward direction while at the same time a drive signal is supplied to the carriage-feed motor driver 35 to rotate the carriage driving pulse motor 10 by one pulse to move the carriage 6 in the arrow direction R by one pitch, that is, $\frac{1}{8}$ mm. At this time, reading signals 39 are again applied to the page memories 31Y, 31M, 31C and 31BK to drive the recording head 7Y, so that an yellow dot is recorded on the recording paper 1 in response to dot data at the address 101C0002 in the page memory 31Y.

Such an operation is repeated to move the carriage 6 progressively in the arrow direction R to record dot data at the column addresses C0001–C0080 on the line address 101 in the page memory 31Y. Thus, a train of yellow dots are vertically recorded on the recording paper 1 with a spacing of 16 mm. Subsequently, the disable signal to the head driver 34M is removed to supply the respective page memories 31Y, 31M, 31C and 31BK with reading signals 39, so that dot data at the address 101C0081 in the page memory 31Y will be applied to the recording head 7Y and that dot data at the address 101C0001 in the page memory 31M will be supplied to the recording head 7M. Consequently, the ink of magenta M is printed over the ink of yellow Y on the recording paper 1 as shown in FIG. 2A.

Next, the contents of the column-address pointers 32Y, 32M, 32C and 32BK are stepped in the forward direction while at the same time the carriage 6 is moved by one pitch in the direction R. Reading signals 39 are again supplied to the respective page memories to drive the recording heads 7Y and 7M. As a result, yellow dots corresponding to dot data at the address 101C0082 in the page memory 31Y and magenta dots corresponding to dot data at the address 101C0002 in the page memory 31M are recorded on the recording paper 1. Such an operation is repeated to move the carriage 6 progressively in the arrow direction R. If dot data at the column addresses 0082–0160 on the line address 101 in the page memory 31Y have been recorded on the recording paper 1, the head driver 34C is then released from its disable state to apply reading signals 39 to the respective page memories 34Y–31BK. Thus, the recording head 7C will be supplied with dot data at the address 101C0001 in the page memory 31C. If dot data at the column addresses C0161–C0240 on the line address 101 in the page memory 31Y have been recorded on the recording paper 1, the disable signal to the head driver 34BK is then removed. Thus, all the disable signals are removed to drive all the recording heads 7Y, 7M, 7C and 7BK.

The above operation is repeated to move the carriage 6 in the arrow direction R. Immediately after dot data at the column address C1680 on the line address 101 in the page memory 31Y has been recorded on the recording paper 1, a disable signal 40 is supplied to the yellow-head driver 34Y to stop it. Similarly, disable signals 40 are applied to the respective head drivers 34M, 34C and 34BK to stop them immediately after dot data at the column address C1680 in the respective page memories 31M, 31C and 31BK. In this manner, dot data at the column addresses C0001–C1680 on the line address 101 in the respecitve page memory can be recorded on the recording paper 1.

Figure 2A:
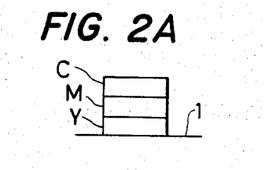
FIGS. 2A and 2B illustrate examples of recording corresponding to the steps of FIGS. 1A and 1B, respectively.
Figure 2B:
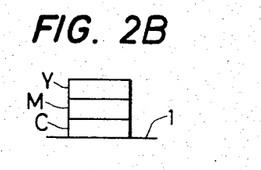

Thus, the colored inks are printed one over another on the recording paper 1 in the order of yellow dots, magenta dots, cyan dots and black dots from the bottom with the spacing of 16 mm in the vertical direction (see FIG. 2A). Subsequently, the carriage 6 is moved leftward in the direction L and then returned to its extreme right position in which it is detected by the right-hand position sensor 13 which in turn provides a predetermined drive pulse to the paper-feed motor driver 36. As a result, the paper-feed pulse motor 3 is rotationally driven to move the recording paper 1 in the arrow direction Y by a distance of 16 mm as shown in FIG. 3 or 4. It is noted that the illustrated embodiment is such that the carriage 6 is located at its extreme right position when the central recording head 7K is recording the dot data at the column address C1680 and that the carriage 6 is to be started in its return stroke from the extreme right position at which the carriage is detected by the right-hand position sensor 13.

Next, the column-address pointers 32Y, 32M, 32C and 32BK are present respectively at 1680, 0080, 0160 and 0240 while at the same time the line-address pointer 33 is preset at 02. Disable signals 40 are applied to the head drivers 34M, 34C and 34BK except the head driver 34Y so that these head drivers will be inoperative. In addition, head changing signals 38 are applied to the drivers 34M, 34C and 34BK from the microprocessor 37 in response to the signal from the position sensor 13 such that the recording heads 7M, 7C and 7BK used in the forward stroke of the carriage will be cut off while the recording heads 8M, 8C and 8BK used in the return stroke of the carriage will be active.

If reading signals 39 are applied to the respective page memories 31Y, 31M, 31C and 31BK in the just-mentioned state, dot data are read out from the respective addresses 102C1680, 102C0080, 102C0160 and 102C0240 in the page memories 31Y, 31M, 31C and 31BK. Since the head drivers other than the head driver 34Y are now inoperative, only the recording head 7Y is driven, such that yellow dots are recorded on the recording paper 1 in response to the dot data. Subsequently, the contents of the column address pointers 32Y, 32M, 32C and 32BK are stepped in the reverse direction while at the same time the carriage 6 is moved in the arrow direction L to effect the recording operation.

At each time the respective column-address pointer 32M, or 32C or 32BK is changed from 1 to 1680, the disable signal to the corresponding head driver 34M, 34C or 34BK is removed, so that all the recording heads 7Y, 8M, 8C and 8BK will be driven in the return movement of the carriage. At this time, the order in which the recording heads 7Y, 8M, 8C and 8BK are to be driven is as described herein: The colored inks are applied to the recording paper in the order of yellow, magenta, cyan and black in the direction of movement of the carriage 6 as in the recording heads 7Y, 7M, 7C and 7BK in the forward stroke of the same carriage. Thus, the colored inks are printed one over another in the same order of yellow, magenta, cyan and black in both the forward and return strokes of the carriage 6. Therefore, any change in color tone will not cause during the reciprocation of the carriage, so that the resulting image is extremely faithful to the original picture.

The subsequent recording operation in the return stroke of the carriage is carried out as in the forward stroke of the same carriage except that the carriage 6 is moved in the arrow direction L in synchronism with the reverse stepping of the contents of the column-address pointers 32Y, 32M, 32C and 32BK. Each of the head drivers 34Y, 34M, 34C and 34BK successively receives a disable signal at each time that dot data at the column address C0001 in the corresponding page memory has been recorded. Thus, the recording operation is similarly carried out with respect to dot data at the column addresses C1680–C0001 on the line address 102 in the respective page memories. Subsequently, the carriage 6 is moved rightward in the direction R. If the carriage 6 reaches its extreme left position and then is detected by the left-hand position sensor 12, the paper-feed pulse motor 3 is then rotated to move the recording paper 1 in the arrow direction Y by 16 mm, so that the next recording operation in the forward stroke of the carriage is started. Such an operation is repeated to complete all the recording operations up to the line address 120.

Figure 7:
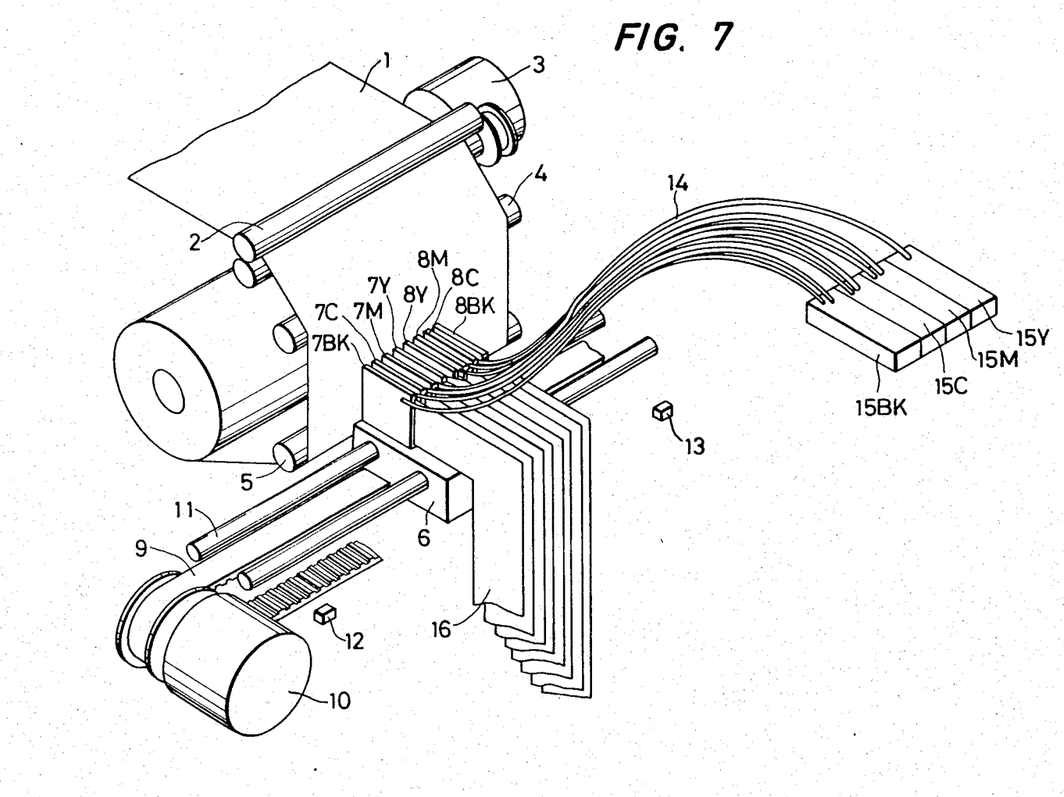
FIG. 7 is a perspective view of another embodiment of the printer according to the present invention.
Figure 8:
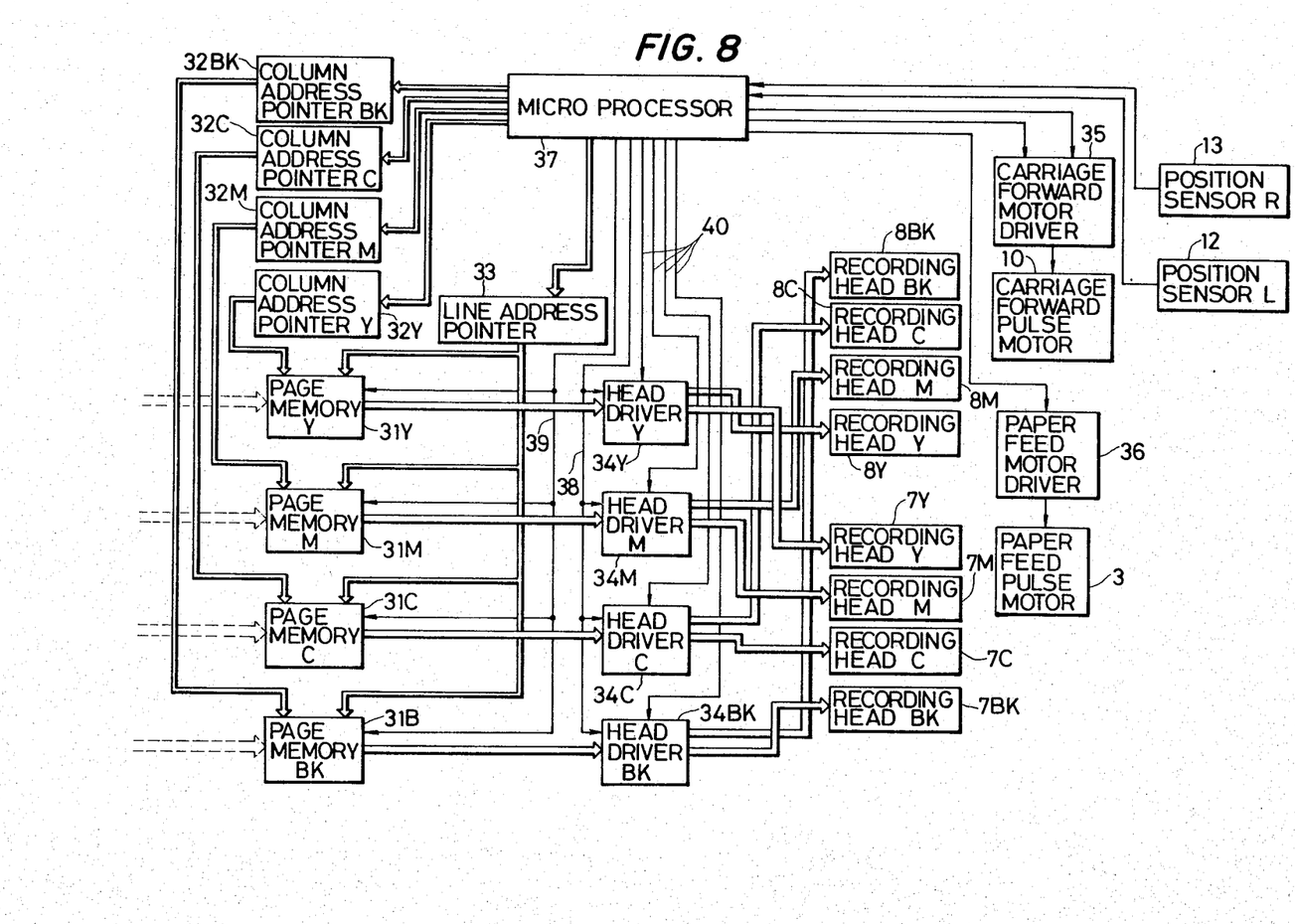
FIG. 8 is a block diagram of a control circuit which may be used in the printer shown in FIG. 7.

FIG. 7 shows the other embodiment of the multi-nozzle ink-jet type color printer according to the present invention, and FIG. 8 illustrates a control circuit which may be used in the color printer shown in FIG. 7. As seen from FIG. 7, this embodiment does not include the common recording head used in both the forward and return stroke of the carriage, but comprises a set of recording heads 7Y, 7M, 7C and 7BK used only in the forward movement of the carriage and another set of recording heads 8Y, 8M, 8C and 8BK utilized only in the return movement of the same carriage. These recording heads are located in the order of 8BK, 8C, 8M, 8Y, 7Y, 7M, 7C and 7BK, starting from the right side of FIG. 7 in the arrow direction L. In other word, two groups of recording heads 7M, 7C and 7BK; 8M, 8C and 8BK are disposed symmetrically about the yellow recording heads 7Y and 8Y each of which is to be used first upon recording.

Figure 9:
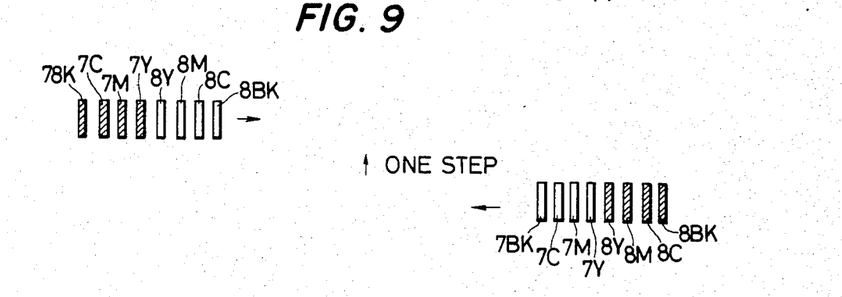
FIG. 9 is a diagram showing the recording process in the printer shown in FIG. 7.

When the carriage 6 is moved in the arrow direction R to effect the recording operation in the forward stroke of the carriage, merely the recording heads 7Y, 7M, 7C and 7BK shown by the left-hand hatching in FIG. 9 are driven. On the other hand, when the carriage 6 is moved in the arrow direction L, only the recording heads 8Y, 8M, 8C and 8BK are driven.

As seen from FIG. 8, the control circuit used in this embodiment includes a single head driver 34Y for driving two central recording heads 7Y and 8Y and which also receives head changing signals 38. The remaining construction will not further described since it is similar to that of the first embodiment shown in FIGS. 3 and 5.

Figure 10:
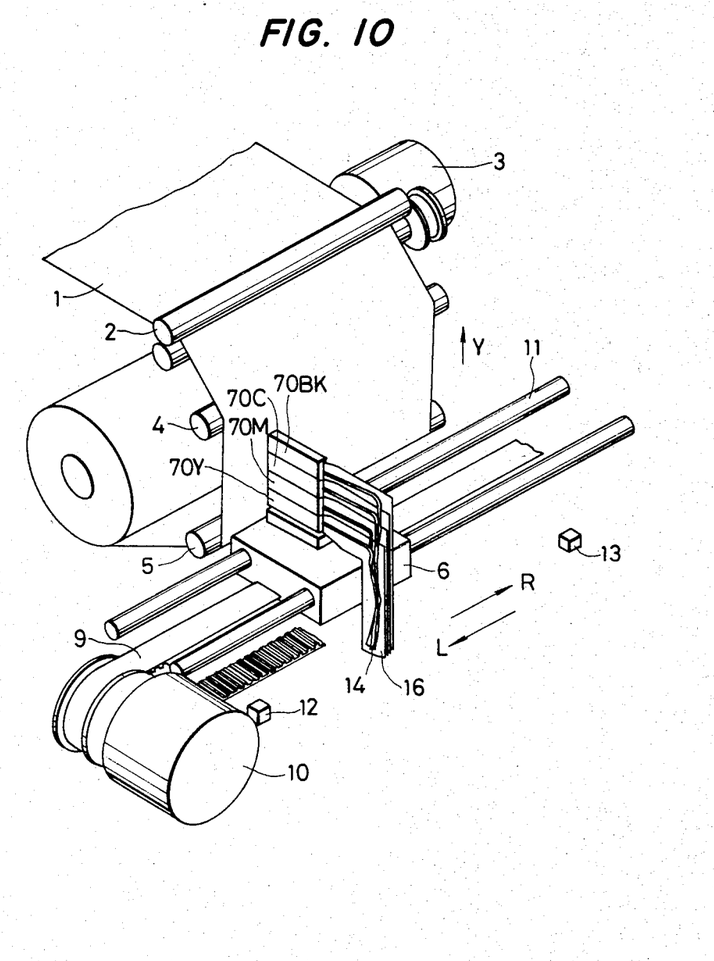
FIG. 10 is a perspective view of still another embodiment of the printer according to the present invention.

FIG. 10 shows a further embodiment of the present invention in which the recording heads for various colors of Y, M, C and BK are disposed in the secondary scan direction. In FIG. 10, the same numerals as those of FIG. 3 designate the same components. 70Y, 70M, 70C and 70BK denote multi-nozzle ink-jet type recording heads for yellow, magenta, cyan and black, respectively. Each of these heads includes 128 nozzles which are disposed on a straight line in the arrow direction Y with a spacing of 8 nozzles/mm.

Figure 11:
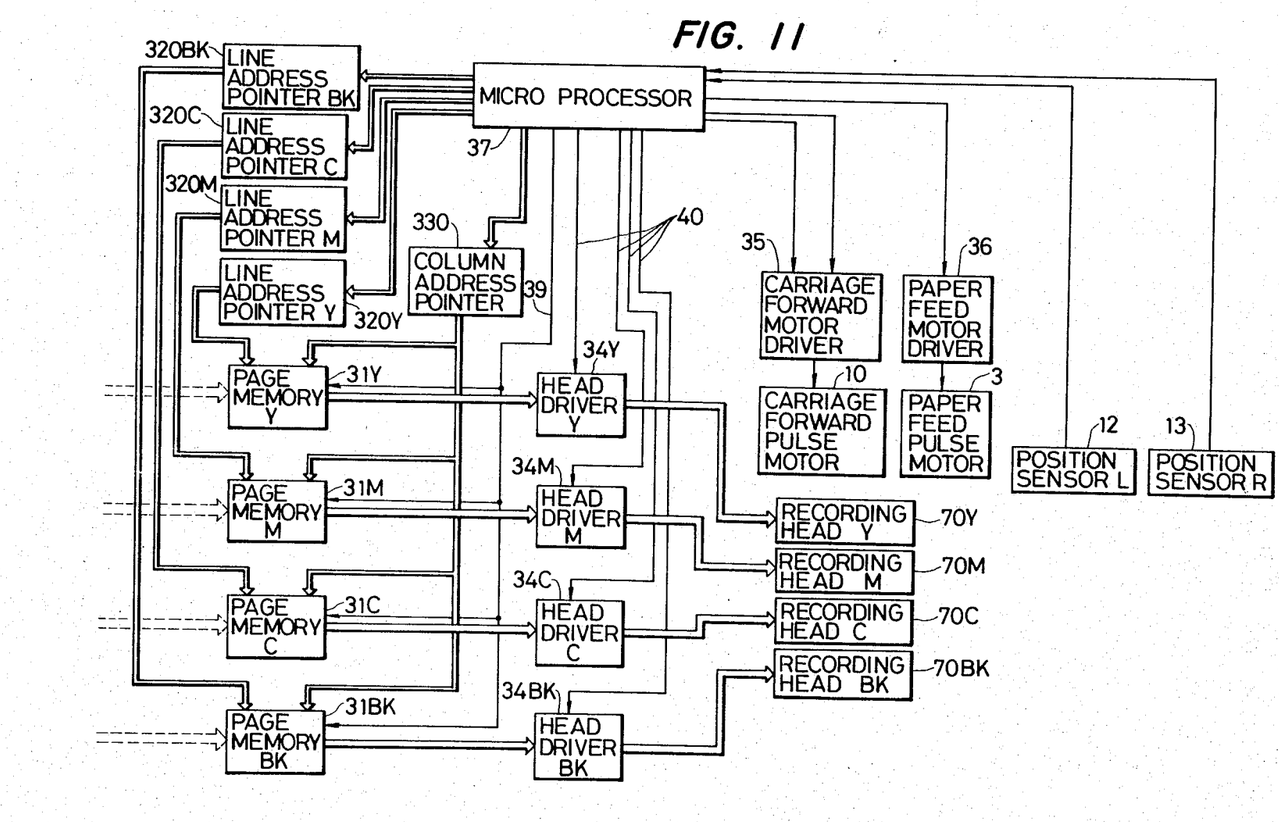
FIG. 11 is a block diagram of a control circuit which may be used in the printer shown in FIG. 10.

FIG. 11 shows a control circuit which may be utilized in the embodiment shown in FIG. 10. In FIG. 11, the same numerals as those of FIG. 5 designate the same components which will not be therefore described herein. The control circuit includes line-address pointers 320Y, 320M, 320C and 320BK for addressing the respective line addresses in the page memories 31Y, 31C, 31M and 31BK. In this embodiment, these line-address pointers are ring counters for counting the number of 01 to 20. The control circuit also includes a column-address pointer 330 for addressing the column addresses in the respective memories simultaneously. It is assumed herein that each of the page memories is assigned as in the embodiment shown in FIG. 6.

The recording process in this embodiment will be described with reference to FIG. 11. Although the recording paper 1 is re-wound from a roll (not shown) as afore-mentioned, the recording paper is shown with the upper end being cut out for simplicity. Addresses on the paper face are indicated at the upper portion and left side of the paper. It is further assumed that each of the page memories 31Y, 31M, 31C and 31BK contains dot data for one color written therein prior to the recording operation.

The carriage 6 is first moved leftward in the direction L to its extreme left position in which it is detected by the left-hand position sensor 12 which in turn produces a detection signal. At this time, each of the heads 70Y, 70M, 70C and 70BK is in its extreme left position within the range of recording as shown by a solid line or chain line in FIGS. 12A–12D. This extreme left position corresponds to a column address C1. The line-address pointers 320Y, 320M, 320C and 320BK are respectively preset at 01, 20, 19 and 18 while at the same time the column-address pointer 330 is preset at 0001. All the head drivers 34M, 34C and 34BK except the head driver 34Y is supplied with disable signals 40 to cause these head drivers to be inoperative.

Figure 12A:
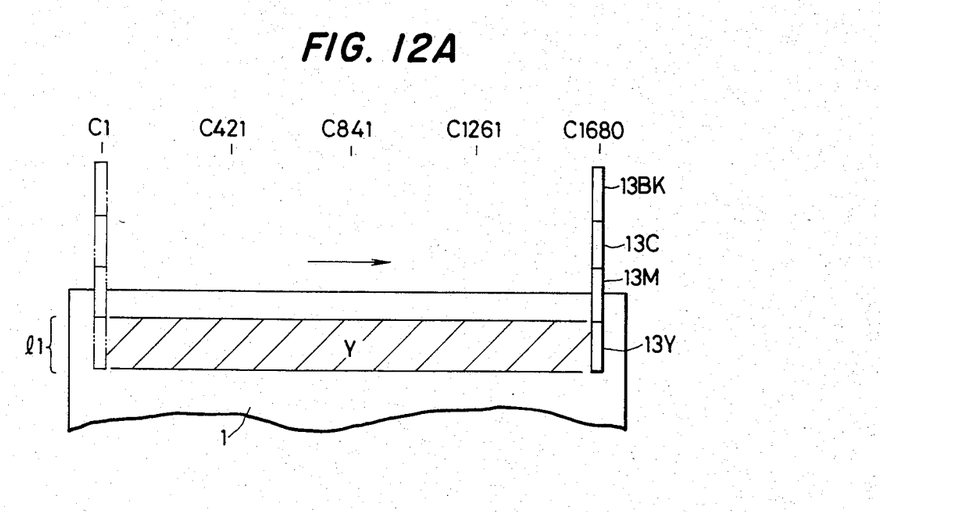
FIGS. 12A–12D illustrate the recording process in the printer of FIG. 10.

If reading signals 39 is applied to the page memories 31Y, 31M, 31C and 31BK in the above state, dot data are read out from the respective addresses 101C0001, 120C0001, 119C0001 and 118C0001 in the page memories 31Y, 31M, 31C and 31BK. Since only the recording head driver 34Y is operative, however, the recording head 70Y is merely driven to record yellow dots on the recording paper 1 in response to the dot data. The contents of the column-address pointer 330 are subsequently stepped in the forward direction while at the same time the carriage-feed motor driver 35 is supplied with a drive signal to rotate the carriage-feed pulse motor 10 by one pulse, so that the carriage 6 is moved in the arrow direction R by one pitch, that is, by $\frac{1}{8}$ mm. At this time, reading signals 38 are again applied to the respective page memories 31Y, 31M, 31C and 31BK to drive the recording head 70Y to record on yellow dot on the recording paper 1 in response to the dot data at an address 101C0002 in the page memory 31Y. Such an operation is repeated to move the carriage 6 in the arrow direction R to record dot data at column addresses C0001–C1680 on line address 101 in the page memory 31Y. Thus, yellow dots are recorded on the recording paper 1 with a spacing of 16 mm in the vertical direction as shown in FiG. 12A. When each of the recording heads 70Y, 70M, 70C and 70BK has recorded the dot data at the column-address C1680, the carriage 6 is positioned at the right end of its stroke and detected by the right-hand position sensor 13.

Figure 12B:
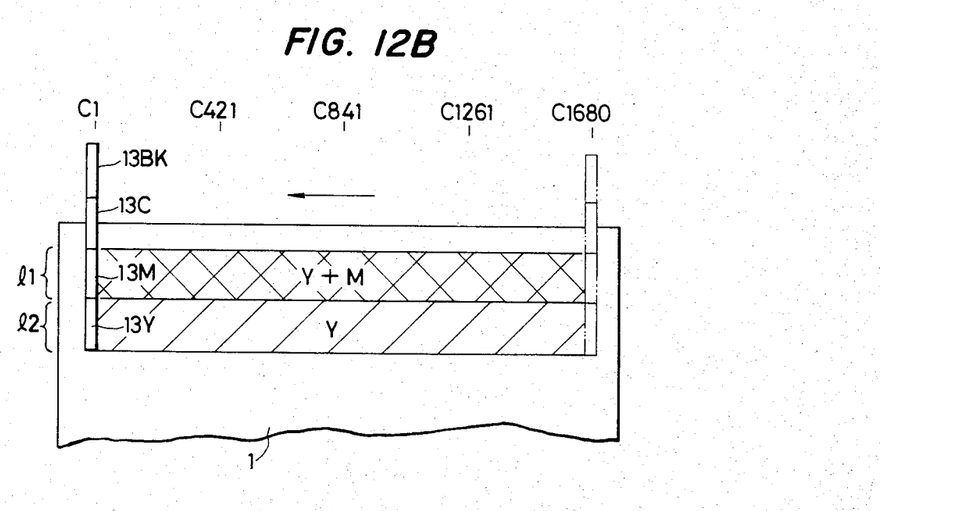

If the carriage 6 reaches its extreme right position and is detected by the position sensor 13, a predetermined drive pulse is applied to the paper-feed motor driver 36 to rotate the paper-feed pulse motor 3 to move the recording paper 1 in the arrow direction Y by 16 mm as shown in FIG. 12B. The line-address pointers 320Y, 320M, 320C and 320BK are stepped in the forward direction. Therefore, the respective line addresses are at 02, 01, 20 and 19. Disable signals are applied to the head drivers 34C and 34BK to be inoperative.

If reading signals 39 are applied to the respective page memories 31Y, 31M, 31C and 31BK in the just-mentioned state, dot data at the line-address 102 in the page memory 31Y are supplied to the recording head 13Y, and dot data at the line address 101 in the page memory 31M are supplied to the recording head 13M. If the carriage 6 is moved in the arrow direction L in synchronism with the reverse stepping of the contents of the column-address pointer 330 which has been at 1680, magenta dots corresponding to dot data at the line address 101 in the page memory 31M are recorded over the area 11 of the recording paper 1 on which the aforementioned yellow dots have been recorded. On the next area 12 of the recording paper are newly recorded yellow dots corresponding to dot data at the line address 102 in the page memory 31Y.

Figure 12C:
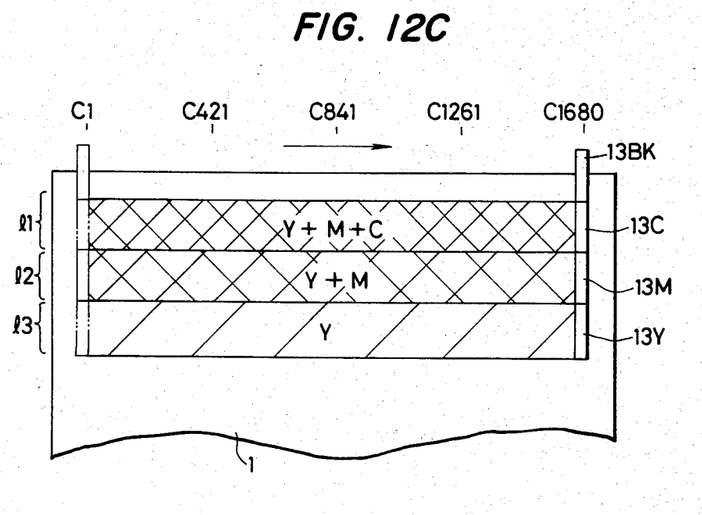
Figure 12D:
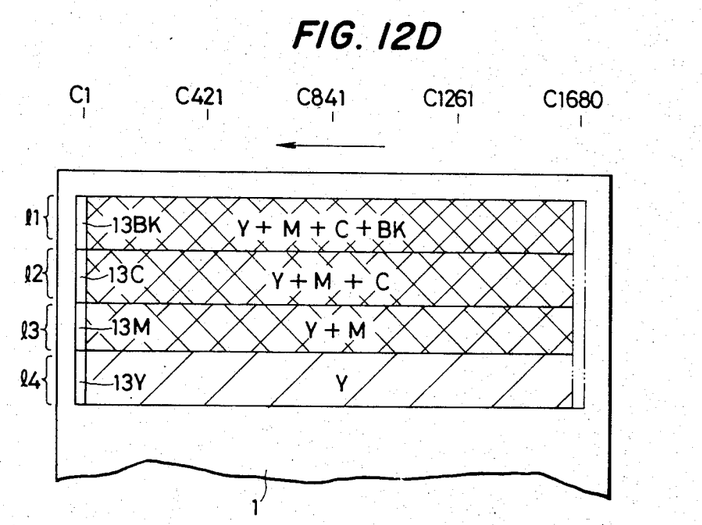

Subsequently, the head driver 34BK is only disabled while at the same time the respective line-address pointers are stepped in the forward direction. Thereafter, the carriage 6 is again moved in the arrow direction R to effect such a recording as shown in FIG. 12C. That is, cyan dots corresponding to dot data at the line-address 101 in the page memory 31C are recorded over the area 11 of the recording paper. Magenta dots corresponding to data at the line address 102 in the page memory 31M are recorded over the area 12 of the recording paper, and yellow dots corresponding to data at the line address 103 in the page memory 31Y are newly recorded over the third area 13 of the recording paper.

Subsequently, all the head drivers 34Y, 34M, 34C and 34BK are operated while at the same time the contents of the respective line-address pointers are stepped in the forward direction. If the carriage 6 is thereafter moved in the arrow direction L, such a recording as shown in FIG. 12C is carried out so that all the color dots of Y, M, C and BK will completely be recorded one over another.

By repeating such a recording operation, color dots corresponding to dot data at the respective line addresses 101–120 in the page memories 31Y, 31M, 31C and 31BK are respectively recorded one over another on the lines 11–120 of the recording paper 1.

If the contents of the respective line-address pointers 32Y, 32M, 32C and 32BK are stepped in the forward direction after the recording head 70Y has recorded yellow dots on the line 120, the respective contents are at 01, 20, 19 and 18. If at this time the recording operation proceeds as dot data for the next page have been written in the page memory 31Y, the recording head 70Y would record yellow dots on a line 11 of the next page. If there is no data to be recorded, each of the head drivers 34Y, 34M, 34C and 34BK is supplied with a disable signal 40 to be inoperative as the recording operation has been terminated on the line 20 with reference to that head driver. This prevents any unrequired record of dot.

Figure 13:
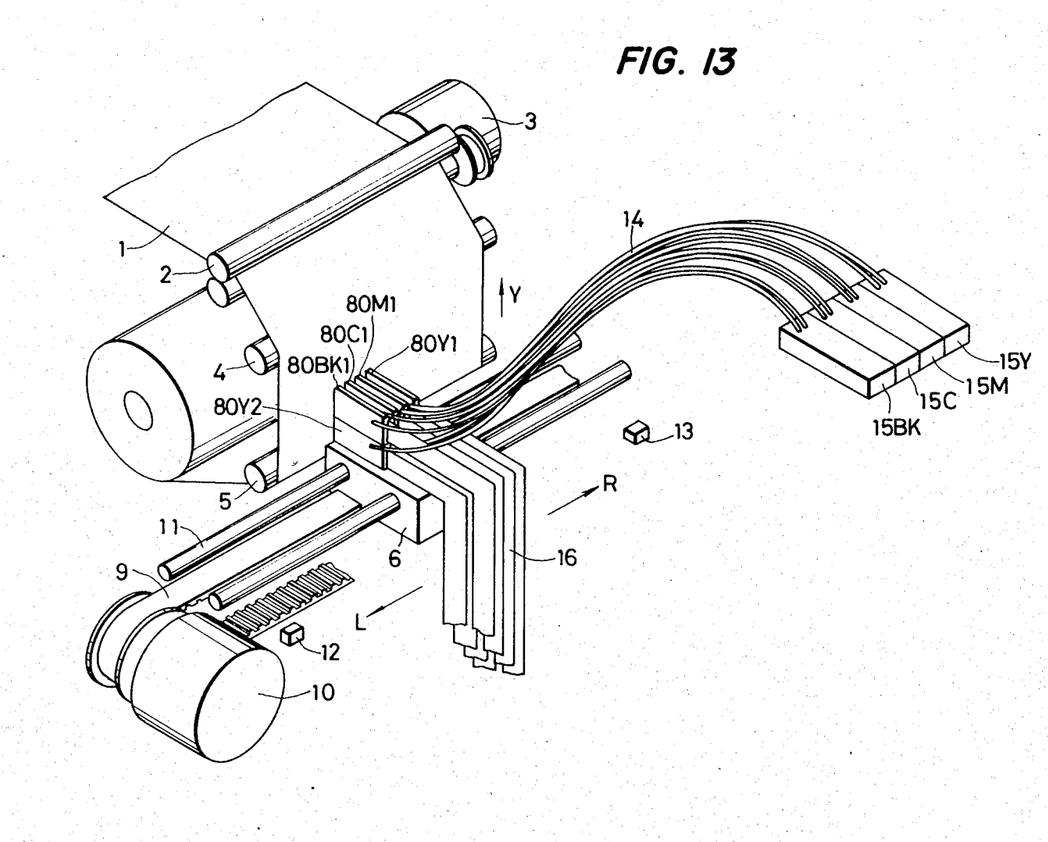
FIG. 13 is a perspective view of a further embodiment of the printer according to the present invention.

A further embodiment of the present invention will be described with reference to FIG. 13 in which recording heads for colors Y, M, C and BK are arranged in two stages in the secondary scan direction. In FIG. 13, the same components as in FIG. 3 are designated by the same reference numerals and therefore will not further be described herein.

Multi-nozzle ink-jet type heads 80 are arranged in two stages each containing four heads on the carriage 6. Four heads in the upper stage are disposed in the arrow direction L in the order of $80Y_1$ (yellow), $80M_1$ (magenta), $80C_1$ (cyan) and $80BK_1$ (black) while four heads in the lower stage are arranged in the arrow direction R in the order of $80Y_2$, $80M_2$, $80C_2$ and $80BK_2$. Each of the heads includes 128 nozzles which are disposed on a straight line in the arrow direction Y with a spacing of 8 nozzles/mm. Each of the nozzles is adapted to discharge the corresponding color ink toward the recording paper 1 in accordance with a drive pulse supplied from the corresponding flexible printed circuit board 16.

Figure 14:
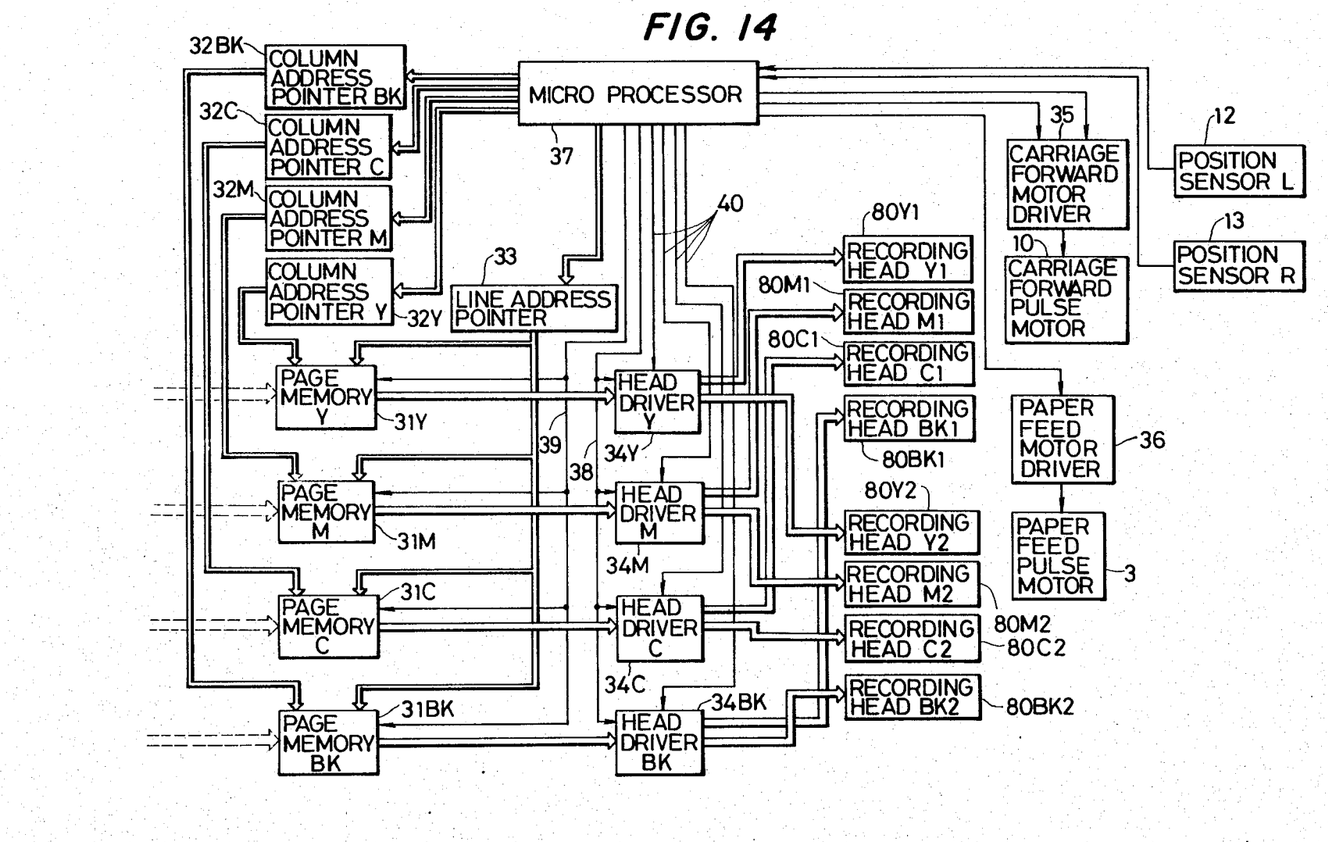
FIG. 14 is a block diagram of a control circuit which may be used in the printer shown in FIG. 13.

FIG. 14 shows a control circuit which may be used in the embodiment of FIG. 13. This control circuit is substantially similar to that of FIG. 8 and therefore the description of the components thereof will be omitted.

The recording process in the embodiment of FIG. 13 will now be described with reference to FIG. 14. Although the recording paper 1 is continuously re-wound from a roll (not shown) as afore-mentioned, the recording paper is shown with the upper end thereof being cut out. Addresses on the paper are shown on the upper portion and left side of the recording paper. In addition, it is assumed herein that each of the page memories 31Y, 31M, 31C and 31BK has been written by dot data for one color prior to the recording operation thereof.

First of all, the carriage 6 is moved leftward in the direction L to its extreme left position in which it is detected by the left-hand position sensor 12 which in turn provides a detection signal. At this time, the recording heads $80Y_1$ and $80BK_2$ are at the left-hand edge of the recording paper 1, that is, in a position opposed to a column address C1, as shown by a chain or solid line in FIGS. 14A and 14B. The line-address pointer 33 is preset at 1. The column-address pointers 32Y, 32M, 32C and 32BK are preset respectively at 1, 1601, 1521 and 1441 for the space interval between each adjacent heads. In this embodiment, the space interval is 80 dots (10 mm). Head changing signal 38 are supplied to the respective recording-head drivers 34Y, 34M, 34C and 34BK the output signals of which are in turn applied respectively to the recording heads $80Y_1$, $80M_1$, $80C_1$ and $80BK_1$ in the upper stage. The head drivers 34M, 34C and 34BK are supplied with disable signals 40 to keep them inoperative. This is because the recording heads $80M_1$, $80C_1$ and $80BK_1$ are not still faced to the recording paper 1.

If reading signals 39 are supplied to the respective page memories 31Y, 31M, 31C and 31BK in the just-mentioned state, dot data are read out from the respective addresses 101C0001, 101C1601, 101C1521 and 101C1441 in the page memories 31Y, 31M, 31C and 31BK. Since the head driver 34Y is only active, however, merely the recording head 80Y is driven to record an yellow dot on the recording paper in response to that dot data. Subsequently, the contents of the column-address pointers 33Y, 33M, 33C and 33BK are stepped in the forward direction while at the same time a drive signals is applied to the carriage-feed motor driver 35 to rotate the carriage-feed pulse motor 10 by one pulse, so that the carriage 6 will be moved in the arrow direction R by one pitch, that is, ⅛ mm. At this time, reading signals 39 are again supplied to the respective page memories 31Y, 31M, 31C and 31BK to drive the recording head 80Y to record an yellow dot on the recording paper 1 in response to dot data at the address 101C0002 in the page memory 31Y. Such a recording operation is repeated to move the carriage 6 in the arrow direction R by 80 dots (10 mm).

In this position, the recording head $80M_1$ will be faced to the column address C1 on the recording paper 1, and the column address in the column-address pointer C will be C0001. As a result, the recording-head driver 34M is released from its disabled state and then the recording operation is continued in the arrow direction R. Therefore, the recording head 80M scans the area of the recording paper which has been scanned by the recording head 80Y, so that magenta dots will be recorded in accordance with dot data supplied from the page memory 31M.

If the carriage 6 is thereafter moved further by 80 dots, the recording-head driver 34C is released in its disabled state. At still further 80 dots, the carriage 6 is moved in the arrow direction R while releasing the recording-head driver 34BK from its disabled state.

In the right-hand area of the recording paper 1, disable signals 40 are again supplied to the respective head drivers 34Y, 34M, 34C and 34BK to be inoperative in such an order that the recording on the column addresses C1680 have successively been terminated, that is, in the order of $80Y_1$, $80M_1$, $80C_1$ and $80BK_1$.

Figure 15A:
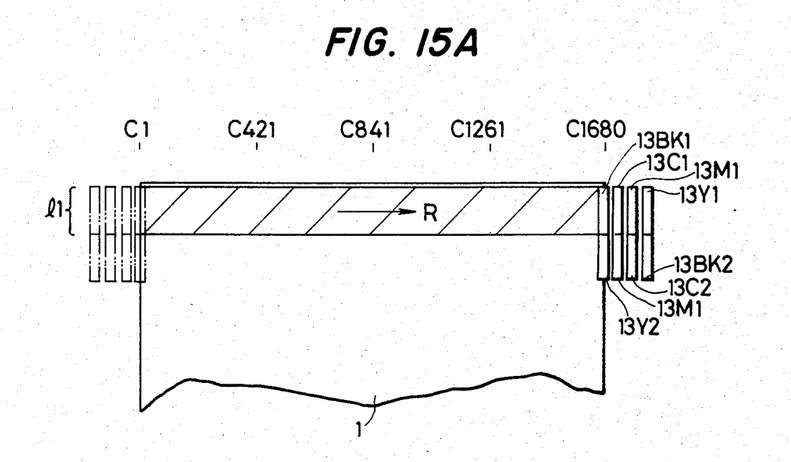
FIGS. 15A and 15B illustrate the recording process in the printer of FIG. 13.

When the carriage 6 reaches its extreme right position and the recording head $80BK_1$ is faced to the column address C1680, the position sensor 13 produces a detection signal. As a result, the movement of the carriage 6 and the reading-out of the page memories 31Y, 31M, 31C and 31BK are stopped. At this time, the line address l1 of the recording paper 1 includes a color image constituted of four kinds of colored dots recorded thereon as shown by hatching in FIG. 15A.

Thereafter, the carriage 6 is moved in the arrow direction L to cause it to effect a similar recording operation. As mentioned hereinbefore, the ring counters are used to be the column-address pointers 32Y, 32M, 32C and 32BK. Therefore, the respective column addresses are at 241, 161, 81 and 1 when the previous movement of the carriage 6 in the arrow direction R has been terminated. In order to effect the recording operation in the arrow direction L, the respective column-address pointers 32Y, 32M, 32C and 32BK may simply be stepped in the direction opposite to that of the previous recording operation. The line-address pointer 33 is stepped in the forward direction and the output signals from the respective recording-head drivers 34Y, 34M, 34C and 34BK are applied respectively to the recording heads $80Y_2$, $80M_2$, $80C_2$ and $80BK_2$ in the lower stage.

Figure 15B:
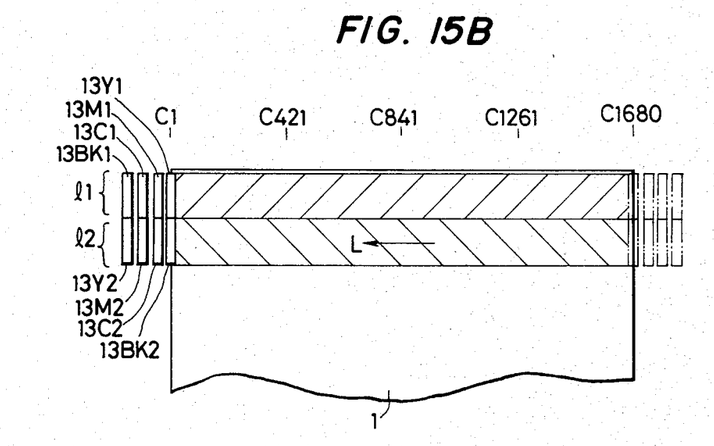

In this manner, the recording operation in the arrow direction L is also carried out such that the head drivers 34Y, 34M, 34C and 34BK are partially disabled in both the initiation and termination of movement of the carriage, as in the previous recording operation in the arrow direction R. As a result, a color image of four colors will be recorded on the recording paper 1 at its line address l2 as shown in FIG. 15B.

If the reciprocative motion of the carriage 6 is terminated, a predetermined signal is applied to the paper-feed motor driver 36 to rotate the paper-feed motor 3, so that the recording paper 1 will be moved in the arrow direction Y by two lines, that is, 32 mm.

Subsequently, similar recording operations are carried out up to the line address 120 to provide a color image composed on the basis of the data for four colors which have been stored in the page memories 31Y, 31M, 31C and 31BK.

In accordance with the present invention, the recording operation can be carried out in the return stroke of the carriage as well as the forward stroke thereof to increase the recording operation in speed. Therefore, the carriage is not required to return at higher speed as in the prior art. As a result, the present invention simplifies the carriage-feed motor drivers and prevents any reaction which may be produced in the machine housing if the carriage is returned at higher speed.

Although the recording paper 1 has been described to move in the direction Y for the secondary scan in the illustrated embodiments of the present invention, it may be considered that the recording paper is stationary and rather the carriage is moved in the direction opposite to the direction Y as in an X-Y plotter.

Furthermore, the present invention is not limited to the ink-jet type printer as in the illustrated embodiments. The present invention may preferably be applied to thermal transfer type printers and the others.

What we claim is:

1. A recording apparatus comprising:
    recording means reciprocatable relative to a recording medium to record an image on the recording medium;
    said recording means including a plurality of recorders; and
    means for selectively driving said plurality of recorders in combined sets which are different from each other in the forward and return movements of said recording means.

2. A recording apparatus according to claim 1 wherein said recorders selectively driven by said driving means in the forward movement of said recording means are different from those driven by said driving means in the return movement of said recording means.

3. A recording apparatus according to claim 1 wherein said recorders include at least one common recorder driven in both the forward and return movements of said recording means.

4. A recording apparatus according to claim 2 wherein said recording means includes a plurality of recorders used to reproduce a plurality of colors, said recorders being arranged symmetrically to reproduce the same color at the same area of said recording medium in both the forward and return movements of said recording means.

5. A recording apparatus according to claim 3 wherein said recording means includes a plurality of recorders for reproducing a plurality of colors, said recorders being arranged symmetrically about at least one common recorder to reproduce the same color at the same area of said recording medium in both the forward and return movements of said recording means.

6. A recording apparatus according to claim 2 wherein said recording means includes a plurality of recorders for reproducing a plurality of colors, said recorders being arranged in two stages with the recorders contained in one of the stages being disposed along the primary scan direction to have the same order of colors as that of the recorders contained in the other stage in the direction opposite to the direction in which said recorders in said one stage are disposed, thereby reproducing the same color at the same area of said recording medium in both the forward and return movements of said recording means.

7. A recording apparatus according to claim 4, 5 or 6 wherein said recorders are used to record an image composed by three colors; yellow, magenta and cyan.

8. A recording apparatus according to claim 7 wherein said recorders are used to record an image composed by four colors; yellow, magenta, cyan and black.

* * * * *